(12) United States Patent
Doi (10) Patent No.: US 6,181,700 B1
(45) Date of Patent: Jan. 30, 2001

(54) DATA TRANSFER DEVICE HAVING RETRANSMISSION CONTROL FUNCTION

(75) Inventor: Kiyomi Doi, Hirakata (JP)

(73) Assignee: Matsushita Electric Industrial Co., Ltd., Osaka-fu (JP)

(*) Notice: Under 35 U.S.C. 154(b), the term of this patent shall be extended for 0 days.

(21) Appl. No.: 08/895,242

(22) Filed: Jul. 16, 1997

(30) Foreign Application Priority Data

Jul. 17, 1996 (JP) .................................................. 8-187163

(51) Int. Cl.$^7$ .................................................. H04L 12/28
(52) U.S. Cl. ........................................... 370/395; 370/252
(58) Field of Search ................................... 370/230, 232, 370/236, 252, 253, 395, 396

(56) References Cited

U.S. PATENT DOCUMENTS

| | | | |
|---|---|---|---|
| 5,414,619 | * 5/1995 | Katayama et al. | 364/151 |
| 5,483,526 | 1/1996 | Ben-Nun et al. | |
| 5,563,874 | * 10/1996 | Kant | 370/252 |
| 5,694,390 | * 12/1997 | Yamato et al. | 370/230 |
| 6,021,263 | * 2/2000 | Kujoory et al. | 395/200.62 |

OTHER PUBLICATIONS

K. Kant, "Flow Control Mechanisms for SAAL Links", Broadband Communications. Global Infrastructure for the Information Age, Proceedings of the International IFIP–IEEE Conference on Broadband Communications, Canada, 1996, Apr. 1, 1996, pp. 173–184.

R. Cohen, "An Improved SSCOP–like Scheme for Avoiding Unnecessary Retransmissions and Achieving Ideal Throughput" Proceedings of IEEE Infocom 1996. Conference on Computer Communications, Fifteenth Annual Joint Conference of the IEEE Computer and Communications Societies. Networking the Next Generation San Francisco, Mar. 24–28, 1996, vol. 2, No. CONF. 15, Mar. 24, 1996, pp. 855–862.

Ito et al., A Measurement of TCP Throughput Over High–Speed and Long–Delay Network in Technical Report of Ieice. IN95–9, The Institute of Electronics, Information and Communication Engineers (May 1995).

* cited by examiner

Primary Examiner—Huy D. Vu
Assistant Examiner—Alexander Boakye
(74) Attorney, Agent, or Firm—Wenderoth, Lind & Ponack, L.L.P.

(57) ABSTRACT

A protocol processing portion performs SSCOP processing while referring to protocol parameters stored in a parameter managing portion. The parameter managing portion includes a parameter changing portion and a parameter table. The protocol parameters required in performing the SSCOP processing in the protocol processing portion are stored in the parameter table. The parameter changing portion changes the value of a prescribed protocol parameter (MaxPD) in the parameter table depending on the number of data packets whose transfer is required at one time by a data transfer application. A connection setting portion sets a logical channel between the data transfer device and a data transfer device which is a destination of communication through an ATM network, to allow data transfer. The data transfer application sets a logical channel between the data transfer device and a device which is a destination of data transfer upon instructing the connection setting portion, then assembles data to be transferred into packets, and requires transmission of the packet data of the protocol processing portion. A communication control portion sends out to the ATM network control data for setting the logical channel given by the connection setting portion, or the packet data given by the protocol processing portion. Such construction makes it possible to send out a delivery confirmation packet (POLL) immediately after the data packets continuously sent out, and quickly confirm the delivery of the data.

5 Claims, 6 Drawing Sheets

DATA TRANSFER DEVICE HAVING RETRANSMISSION CONTROL FUNCTION

BACKGROUND OF THE INVENTION

1. Field of the Invention

The present invention relates to a data transfer device, and more particularly, to a data transfer device on which a retransmission control protocol is packaged in order to prevent the loss of a data packet due to an error on a line in establishing communication through an ATM (Asynchronous Transfer Mode) communication network.

2. Description of the Background Art

On an ATM network, a data packet is transferred upon being partitioned into cells having a fixed length of 53 bytes. When a bit error on a line, congestion in an exchange, and the like are produced, the cells are discarded, so that data is lost. In order to transfer data high in real time properties such as video data, it is necessary to prevent the lost data, and provide sufficient throughput. In order to prevent the loss of data, a method to package a protocol having a retransmission control function on ATM has been conventionally employed. As the protocol having the retransmission control function, a system for packaging TCP/IP has been generally employed. However, sufficient throughput cannot be obtained (see an article entitled "A Measurement of TCP Throughput over High-Speed and Long-Delay Network" by Ito et al. in Technical Report of Ieice. IN95-9 issued by The Institute of Electronics, Information and Communication Engineers).

On the other hand, International Telecommunication Union-Telecommunication Sector (ITU-TS) recommends SSCOP (Service Specific Connection Oriented Protocol) as a retransmission control function of a signaling message in an ATM network. The SSCOP employs a selective retransmission system. Even when retransmission is produced, therefore, sufficient throughput can be maintained. Further, the arrival delay of a data packet for the retransmission can be reduced. However, the definition of the SSCOP in ITU-T Recommendation is unsuitable for transfer of a large amount of data because it premises the use for signaling.

The procedure for the data transfer using the SSCOP will be described using FIG. 8. In the SSCOP, a sequence number is added for each data packet whose transfer is required, to produce a protocol data unit called SD (hereinafter referred to as PDU), and the PDU is transmitted to a device which is a destination of connection.

When the data transfer is made using the SSCOP, a data link is first set. The data link is set by transferring PDU called BGN to the device which is a destination of connection. A device on the receiving side which received the BGN produces PDU called BGAK and sends out the PDU, to accept the setting of the data link. The first value (hereinafter referred to as NMR) of the sequence numbers of SDs which cannot be received by the device on the receiving side is added to the BGAK. When the number of SDs which can be received by the device on the receiving side is eight, for example, SD(0) to SD(7), the NMR takes a value representing SD(8), i.e., 8. A device on the transmission side can send out SDs in a range in which the number of the SDs does not exceed the NMR. Consequently, the NMR is also called a credit value.

When the setting of the data link is completed, it is possible to transfer the data packet. The device on the transmission side produces SD upon acceptance of a data transfer request, and sends out the SD to the line. When the sequence number at this time is taken as zero, SD(0) shown in FIG. 8 is sent out. A data region for the SD sent out is held by the device on the transmission side. Similarly, SD(1) to SD(5) are sent out. Thereafter, the device on the transmission side produces PDU called POLL (a delivery confirmation packet), and sends out the PDU. The sequence number (hereinafter referred to as NS) of SD to be subsequently transmitted, that is, 6 in this case is added to the POLL. The device on the receiving side produces PDU called STAT after confirming whether or not there is no omission in data to be received upon acceptance of the POLL. The sequence number of the SD which cannot be received, the sequence number (hereinafter referred to as NR) of SD succeeding the SDs continuously received and the NMR are added to the STAT. In this case, the device on the receiving side receives all the data to be received SD(0) to SD(5), thereby only the NR=6 and the NMR are added to the STAT. The NMR is 14 (=6+8) when the number of SDs which can be received by the device on the receiving side at this time point is eight. The difference between the NMR and the NR is a window size on the transmission side (a value representing the number of SDs which may be sent). The device on the transmission side retransmits the SD which cannot be received by the device on the receiving side upon receipt of the STAT, while releasing a data region for the SDs continuously received by the device on the receiving side. In this case, a data region for SD(0) to SD(5) is released.

The following are timings at which POLLs are sent out from the device on the transmission side. The first timing is timing after sending out a predetermined number of SDs. The number is defined as a protocol parameter, and is referred to as MaxPD. The second timing is the time when a time-out of a timer for monitoring a transmission interval of the POLLs occurs. This timer period is referred to as Timer_POLL, and a time-out value of the timer period is defined as a protocol parameter. At the time point of either one of the timings, the POLL is produced, and is sent out. At this time, a counter for counting the number of SDs continuously transferred which is to be compared with the MaxPD is cleared, and the Timer_POLL is also restarted.

Figure 8:
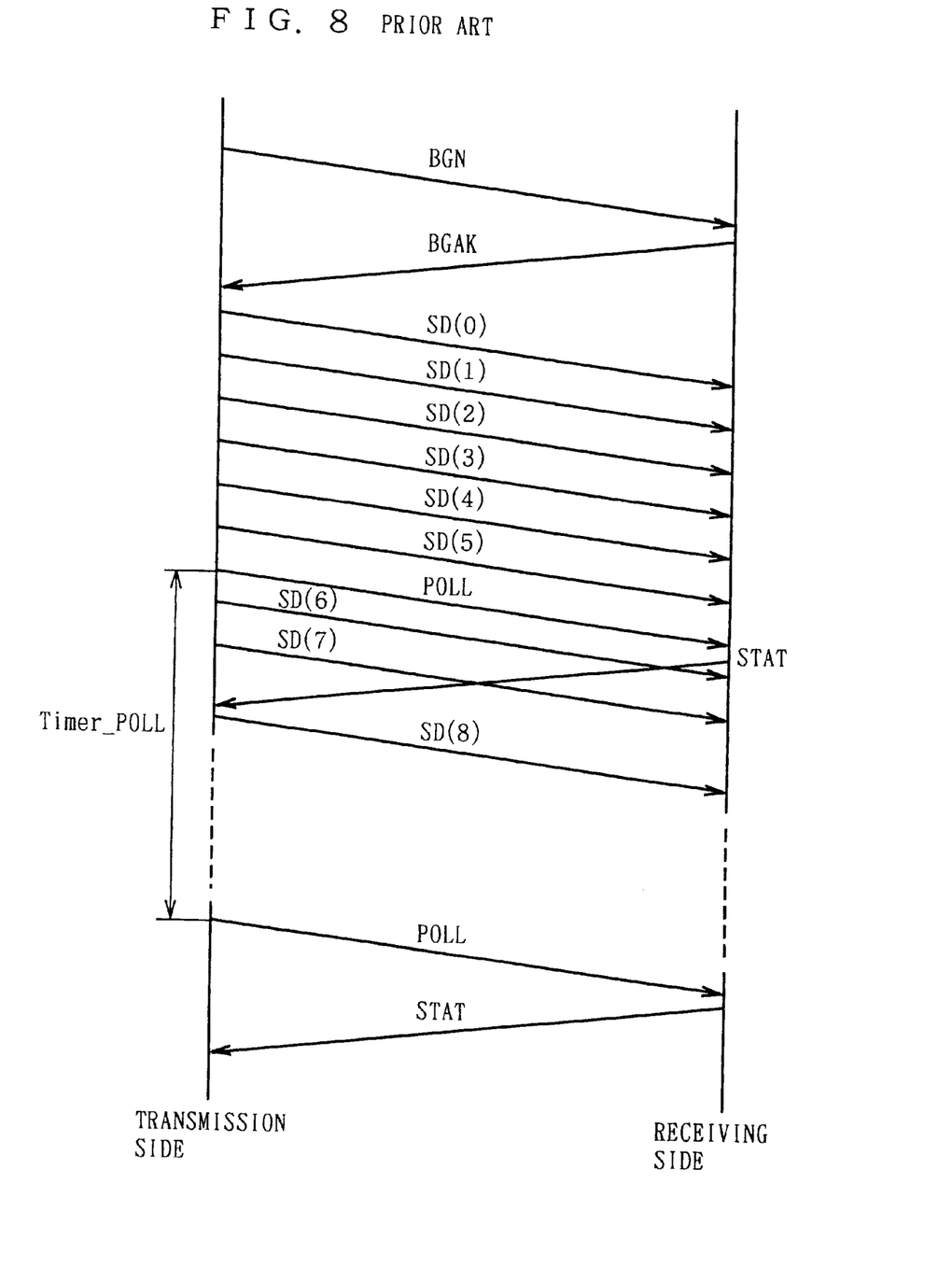
FIG. 8 is a sequence chart showing, in a communication system using a conventional data transfer device, a data transfer sequence between data transfer devices.

FIG. 8 illustrates an example in a case where the MaxPD is six. When six or more SDs are continuously transmitted, the POLL is immediately sent out. If the SDs are sparsely transmitted, the POLL is not sent out until the time corresponding to the timer value of the Timer_POLL has elapsed. When the transmission of the POLL is delayed, the receiving of the STAT is also delayed. Therefore, the updating of the window size and the releasing of the data region held by the device on the transmission side are delayed.

As described in the foregoing, in the SSCOP, the data transfer performance is changed depending on the transfer interval of data packets and the values of the protocol parameters. In ITU-T Recommendation, however, the values of the protocol parameters are fixedly determined for signaling.

As described in the foregoing, if the SSCOP is used, the procedure for retransmission control is carried out on the ATM network, and a high performance can be obtained. When a large amount of data is transferred using the protocol parameters defined for signaling, however, a sufficient transfer capability cannot be obtained. Further, the protocol parameters are fixedly set, thereby various patterns for the data transfer cannot be coped with. In order to transfer various data using the SSCOP, therefore, it is necessary to consider construction suitable for the data transfer. Specifically, such construction that various protocol parameters required for SSCOP processing can be set to values suitable for the transfer of the data packets is necessary.

SUMMARY OF THE INVENTION

An object of the present invention is to provide a data transfer device capable of always efficiently transferring data irrespective of the type of data when the data is transferred using protocol processing including the procedure for selective retransmission such as SSCOP.

In order to attain the above-mentioned object, the present invention has the following characteristics.

A first aspect of the present invention is directed to a data transfer device for establishing data communication through an ATM network. The data transfer device includes components characterized as follows.

A connection setting portion is operable to set a logical connection on the ATM network. A protocol processing portion is operable to preform protocol processing having the procedure for selective retransmission on the logical connection. A parameter table is operable to store a plurality of protocol parameters required for the protocol processing in the protocol processing portion. A parameter changing portion is operable to change the contents of setting of the protocol parameters stored in the parameter table depending on the communication state.

As described in the foregoing, according to the first aspect, the contents of setting of the protocol parameters are changed depending on the communication state, thereby the most suitable parameters can always be set in conformity to the change in a data transfer pattern. Consequently, it is possible to also exhibit a sufficient data transfer performance with respect to the transfer of data that is high in real time properties, such as video data.

A second aspect is characterized in that in the first aspect, the parameter table stores a parameter MaxPD for defining a transmission interval of delivery confirmation packets as one of the plurality of protocol parameters, and the parameter changing portion changes the parameter MaxPD.

As described in the foregoing, according to the second aspect, the parameter MaxPD for defining the transmission interval of the delivery confirmation packets out of the plurality of protocol parameters stored in the parameter table is changed, thereby the protocol parameter can be set to such a value that the delivery confirmation packet after the transmission of data packets can be sent out at suitable timing.

A third aspect is characterized in that in the second aspect, the parameter changing portion changes the parameter MaxPD in accordance with the number of data packets transferred at one time on the logical connection.

As described in the foregoing, according to the third aspect, the number of data packets transferred at one time on the logical connection is set as the value of MaxPD, thereby it is possible to send out the delivery confirmation packets are immediately after the data packets continuously sent out, and quickly confirm the delivery of the data. As a result, the data region held on the transmission side can be quickly released, and can be efficiently used. Further, a window size is updated immediately after the data transfer, thereby it is possible to avoid situations where the window size is not updated by the impossibility of the confirmation of the delivery.

A fourth aspect is characterized by further comprising, in the second aspect, a data transfer monitoring portion operable to monitor a transfer interval of the data packets transferred on the logical connection, and a parameter calculating portion operable to calculate an interval at which the delivery confirmation packets are to be transmitted on the basis of the transfer interval of the data packets, which is monitored by the data transfer monitoring portion, wherein the parameter changing portion changes the parameter MaxPD in accordance with the results of the calculation by the parameter calculating portion.

A fifth aspect is characterized in that in the fourth aspect the parameter table stores a timer period Timer_POLL for defining the maximum allowable transmission interval of the delivery confirmation packets as one of the plurality of protocol parameters, and the parameter calculating portion calculates the number of packets sent out in the timer period TimerPOLL from the transfer interval of the data packets, which is monitored by the data transfer monitoring portion, and determines a value smaller than the calculated number of packets as an interval at which the delivery confirmation packets are to be transmitted.

As described in the foregoing, according to the fifth aspect, the value of MaxPD is dynamically changed depending on the transfer interval of the data packets, thereby the delivery confirmation packets are sent out at an interval always shorter than an interval at which a time-out of the timer period Timer_POLL occurs.

A sixth aspect is characterized by further comprising, in the second aspect, a parameter calculating portion operable to calculate the interval at which the delivery confirmation packets are to be transmitted on the basis of a credit value NMR sent from the receiving side and a sequence number NR of a packet, whose delivery has been already confirmed, sent from the receiving side, wherein the parameter changing portion changes the parameter for defining the transmission interval in accordance with the results of the calculation by the parameter calculating portion.

A seventh aspect is characterized in that in the sixth aspect, the parameter calculating portion calculates the difference between the credit value NMR and the sequence number NR, and takes a value smaller than the calculated difference as an interval at which the delivery confirmation packets are to be transmitted.

As described in the foregoing, according to the seventh aspect, the window size is calculated on the basis of the NMR and the NR reported from the receiving side, and a value smaller than the calculated window size is set as the value of MaxPD. Even when the window size given from a device on the receiving side is small, the data can be transferred without stopping the transmission of the data packets due to the window size.

An eighth aspect is characterized in that in the first aspect, the protocol processing portion performs SSCOP processing as the procedure for selective retransmission.

A ninth aspect is characterized in that in the eighth aspect, the connection setting portion sets a plurality of logical connections on the ATM network, the protocol processing portion performs protocol processing on each of the logical connections, The parameter table stores a plurality of protocol parameters required for the protocol processing in the protocol processing portion for each of the logical connections, and the parameter changing portion changes the contents of setting of the protocol parameters stored in the parameter table for each of the logical connections depending on the communication state in the logical connection.

As described in the foregoing, according to the ninth aspect, the protocol parameter is managed for each logical channel. When the plurality of transfer data exists mixedly, the most suitable data transfer can be made for each logical channel.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Description is now made of embodiments of the present invention using drawings.

First Embodiment

Figure 1:
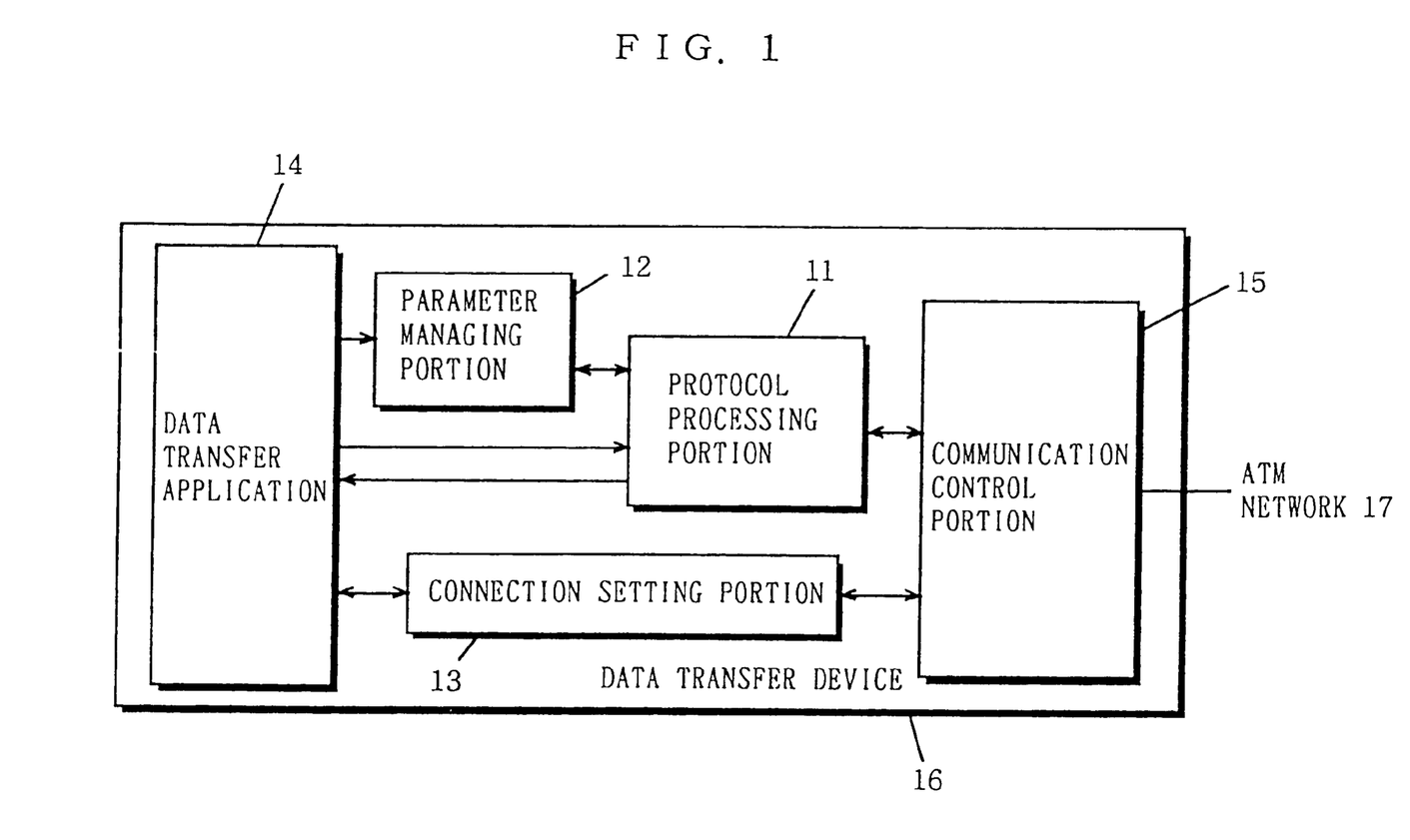
FIG. 1 is a block diagram showing the construction of a data transfer device according to a first embodiment of the present invention.

FIG. 1 is a block diagram showing the construction of a data transfer device according to a first embodiment of the present invention. In FIG. 1, a data transfer device 16 according to the present embodiment comprises a protocol processing portion 11, a parameter managing portion 12, a connection setting portion 13, a data transfer application 14, and a communication control portion 15.

Figure 2:
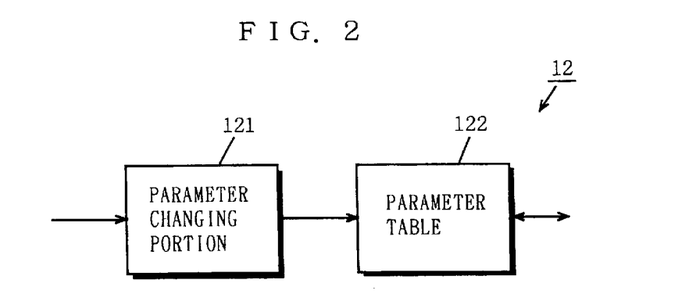
FIG. 2 is a block diagram showing the greater detailed construction of a parameter managing portion shown in FIG. 1.

The protocol processing portion 11 performs SSCOP processing having a retransmission control function while referring to protocol parameters stored in the parameter managing portion 12. The parameter managing portion 12 includes a parameter changing portion 121, and a parameter table 122, as shown in FIG. 2. The protocol parameters required in performing the SSCOP processing in the protocol processing portion 11 are stored in the parameter table 122. The parameter changing portion 121 changes the setting of the protocol parameters in the parameter table, as required. The connection setting portion 13 sets a logical channel between the data transfer device and a data transfer device which is a destination of communication through an ATM network 17, to allow data transfer. The data transfer application 14 instructs the connection setting portion 13 to set a logical channel between the data transfer device and a device which is a destination of data transfer, then assembles data to be transferred into packets, and requires the transmission of the packet data of the protocol processing portion 11. The communication control portion 15 performs processing for sending out to the ATM network 17 control data for setting the logical channel given by the connection setting portion 13 or the packet data given by the protocol processing portion 11.

Operations performed by the data transfer device according to the first embodiment constructed as described above will be described using FIGS. 1 to 4.

Figure 3:
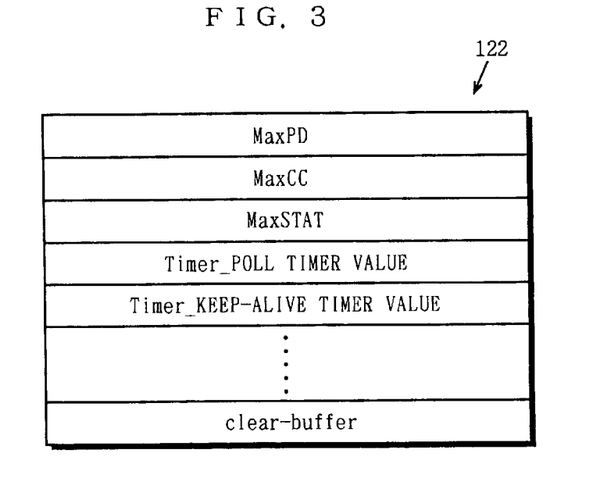
FIG. 3 is a diagram showing the construction of a parameter table used in first to third embodiments of the present invention.

FIG. 3 illustrates the construction of the parameter table 122 shown in FIG. 2. The parameter table 122 stores the protocol parameters required in SSCOP defined in ITU-T Recommendation, including MaxPD.

Figure 4:
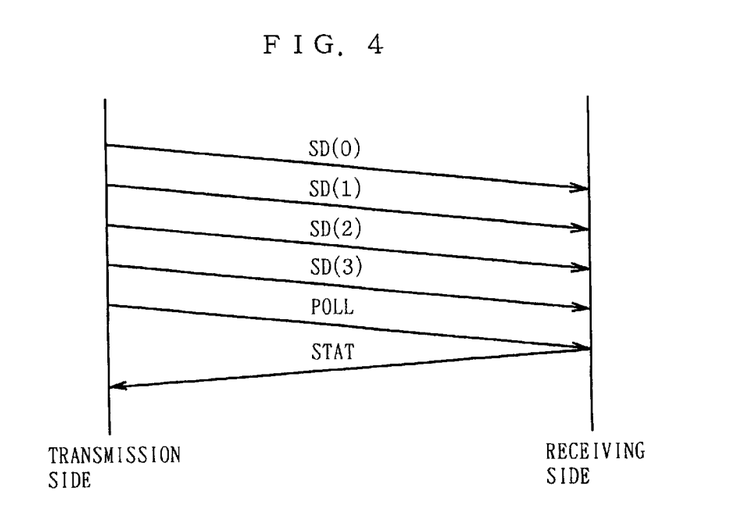
FIG. 4 is a sequence chart showing, in a communication system using the data transfer device according to the first embodiment of the present invention, a data transfer sequence between data transfer devices.

FIG. 4 is a sequence chart showing, in a communication system using the data transfer device shown in FIG. 1, a sequence in performing data transfer between data transfer devices through the ATM network 17.

In the first embodiment, consider a case where the data transfer application 14 collectively requires the transmission of a plurality of SDs. As such situations, cases such as a case where the size of data handled by the data transfer application 14 is large, so that the data is sent upon being partitioned into some packets at the time of transfer are considered. The number of partitions is the number of data packets whose transfer is required at one time from the data transfer application 14. The data transfer application 14 previously gives the number of partitions to the parameter changing portion 121. Correspondingly, the parameter changing portion 121 sets the given number of partitions in the parameter table 122 as MaxPD in FIG. 3. In the present embodiment, the number of partitions is taken as four as one example. Default values shall be set with respect to the other parameters in FIG. 3.

The data transfer application 14 then connects a logical connection between the data transfer device and a device to which the data packets are to be transmitted. Therefore, the data transfer application 14 requires the setting of a connection in which an address of a destination of connection is specified by the connection setting portion 13. Correspondingly, the connection setting portion 13 brings the data transfer device 16 into a state where communication with a destination of connection can be started by performing prescribed connection setting processing. As the connection setting processing at this time, when SVC (Switched Virtual Channel) is set, the connection setting portion 13 performs protocol processing between the data transfer device and an exchange using a signaling protocol, to set assigned logical channel ID and QoS (Quality of Service) in the communication control portion 15. Further, when PVC (Permanent Virtual Channel) is set, the logical channel ID and QoS which are assigned previously are set in the communication control portion 15. The details of a logical channel setting operation are not the prime object of the present invention and hence, the description thereof is omitted.

When the setting of the logical connection by the connection setting portion 13 is completed, the data transfer application 14 requires the setting of a data link with respect to a device which is a destination of connection. The data link is set in the conventional procedure in the protocol processing portion 11. The detailed procedure for data link processing is not the prime object of the present invention and hence, the description thereof is omitted. After the data link is set, the data packets are transferred. The data transfer application 14 produces four packets at one time, and issues a transfer request to the protocol processing portion 11 for each data packet. In the protocol processing portion 11, SD is produced from the required packet, and is sent out to the ATM network 17 through the communication control portion 15. Supposing the first SD is taken as SD(0), four PDUs, that is, SD(0), SD(1), SD(2) and SD(3) are sent out, as shown in FIG. 4. When SD(3) is sent out, the number of transmitted SDs is four, and is not less than the value of MaxPD stored in the parameter managing portion 12, thereby POLL in a case where NS=4 is produced, and is sent out. When the POLL is received by a device on the receiving side, STAT including NR=4 and NMR=NR+(the number of SDs which can be received) is produced, and is sent out to a device on the transmission side. The device on the transmission side releases a data region for SD(0) to SD(3) upon receiving the STAT.

As described in the foregoing, according to the first embodiment, the number of data packets whose transfer is required at one time by the data transfer application 14 is set as the value of MaxPD, so that the POLL can be sent out immediately after the SDs continuously sent out. Therefore, the delivery of the data can be quickly confirmed, and the data region held by the device on the transmission side can be quickly released. As a result, the data region can be efficiently used. Further, the window size is updated immediately after the data transfer, thereby it is possible to avoid situations where the window size is not updated by the impossibility of the confirmation of the delivery.

Second Embodiment

Figure 5:
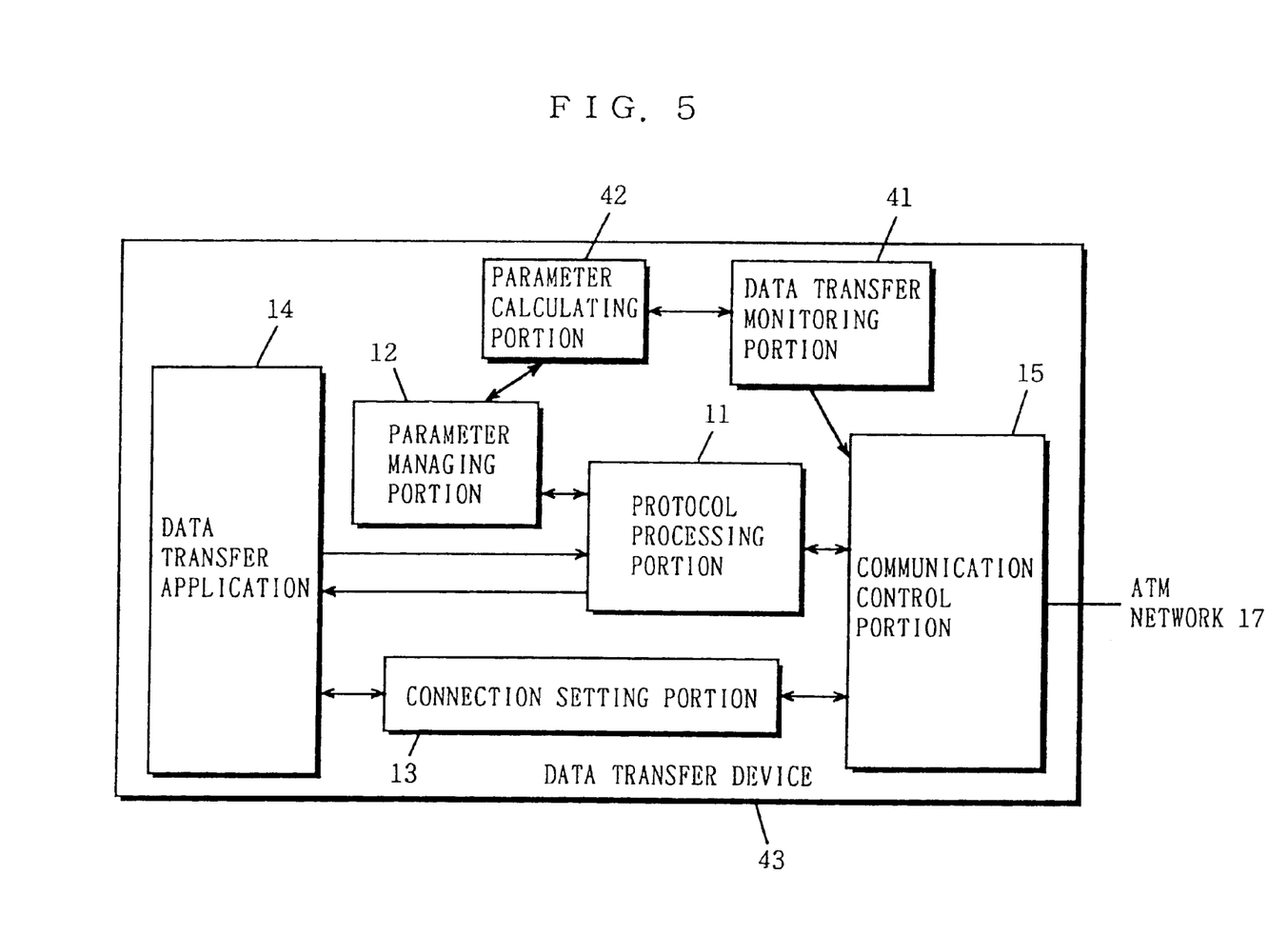
FIG. 5 is a block diagram showing the construction of a data transfer device according to a second embodiment of the present invention.

FIG. 5 is a block diagram showing the construction of a data transfer device according to a second embodiment of the present invention. In FIG. 5, a data transfer device 43 in the present embodiment comprises a protocol processing portion 11, a parameter managing portion 12, a connection setting portion 13, a data transfer application 14, a communication control portion 15, a data transfer monitoring portion 41, and a parameter calculating portion 42.

The data transfer monitoring portion 41 monitors a transfer interval of data packets transmitted through the communication control portion 15. The parameter calculating portion 42 calculates the value of MaxPD on the basis of the transfer interval of the data packets monitored by the data transfer monitoring portion 41 and protocol parameters managed by the parameter managing portion 12. The protocol processing portion 11, the parameter managing portion 12, the connection setting portion 13, the data transfer application 14, and the communication control portion 15 are constructed similarly to corresponding ones shown in FIG. 1.

Operations performed by the data transfer device according to the second embodiment constructed as described above will be described using FIGS. 2, 3 and 5.

Default values previously determined are initialized as the protocol parameters in a parameter table 122 shown in FIG. 3. MaxPD shown in FIG. 3 is set to a sufficiently small value in order that the transmission of SDs is not stopped due to a window size. The default value of MaxPD is taken as 1.

The data transfer application 14 connects a logical connection and sets a data link using the same procedure as that in the first embodiment, refers to the default values of the protocol parameters managed by the parameter managing portion 12, and transfers data.

The data transfer monitoring portion 41 monitors SDs given to the communication control portion 15 from the protocol processing portion 11, and calculates the average transfer interval of the SDs. The parameter calculating portion 42 calculates the number of SDs transferred within a timer period Timer_POLL shown in FIG. 3 managed by the parameter managing portion 12 on the basis of the average transfer interval calculated by the data transfer monitoring portion 41. When the average transfer interval is taken as 10 msec, and a timer value of the Timer_POLL is taken as 400 msec, for example, the number of SDs transferred within the timer period Timer_POLL is 40. The parameter calculating portion 42 outputs a value smaller than 40, for example, 20 (a value which is one-half of 40) as MaxPD to the parameter managing portion 12. Correspondingly, the parameter changing portion 121 in the parameter managing portion 12 rewrites the value of MaxPD in the parameter table 122 shown in FIG. 3 from 1 to 20.

Thereafter, the value of MaxPD referred to by the protocol processing portion 11 is changed to 20, thereby POLL is sent out every time 20 SDs are sent out. The other operations in the second embodiment are the same as those in the first embodiment.

Although in the second embodiment, the average transfer interval of SDs is monitored in the data transfer monitoring portion 41, the maximum transfer interval in a unit time may be monitored, so that the number of SDs transferred within the timer period Timer_POLL can also be calculated by the parameter calculating portion 42 on the basis of the maximum transfer interval. Although in the parameter calculating portion 42, the value which is one-half of the number of SDs transferred within the timer period Timer_POLL is taken as MaxPD, another value can be used, provided that it is not more than the number of SDs transferred within the timer period Timer_POLL.

As described in the foregoing, according to the second embodiment, the value of MaxPD is dynamically changed depending on the transfer interval of the SDs, the POLLs are sent out at an interval which is always shorter than an interval at which a time-out of the Timer_POLL occurs. Specifically, it is possible to select and set the best protocol parameters in a case where the efficiency of the data transfer is not reduced by monitoring the actual situations where the data is transmitted.

Third Embodiment

Figure 6:
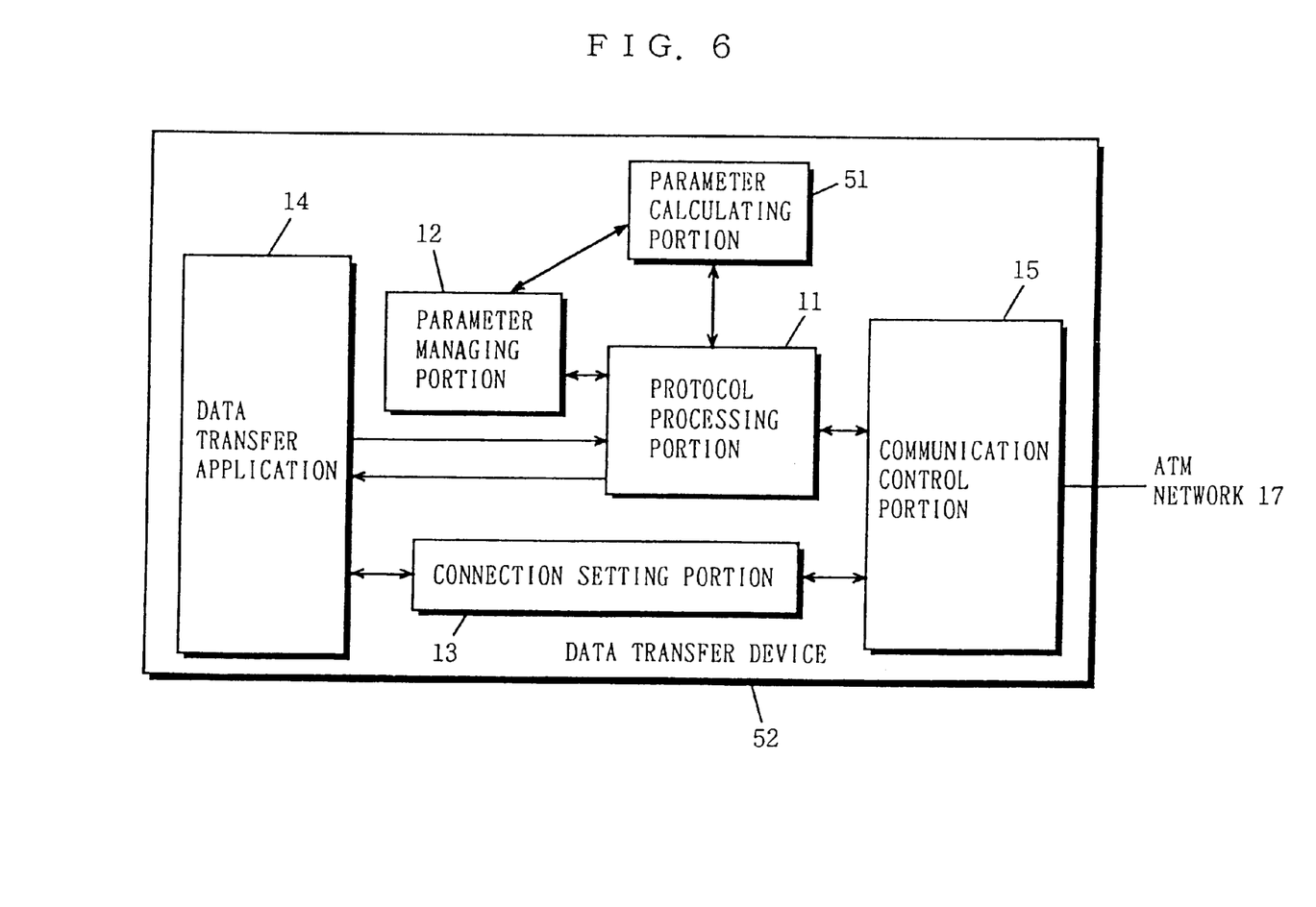
FIG. 6 is a block diagram showing the construction of a data transfer device according to a third embodiment of the present invention.

FIG. 6 is a block diagram showing the construction of a data transfer device according to a third embodiment of the present invention. In FIG. 6, a data transfer device 52 in the present embodiment comprises a protocol processing portion 11, a parameter managing portion 12, a connection setting portion 13, a data transfer application 14, a communication control portion 15, and a parameter calculating portion 51.

The parameter calculating portion 51 calculates the value of MaxPD on the basis of the value of NR and the value of NMR which are received by the protocol processing portion 11. The protocol processing portion 11, the parameter managing portion 12, the connection setting portion 13, the data transfer application 14, and the communication control portion 15 are constructed similarly to corresponding ones shown in FIG. 1.

Operations performed by the data transfer device according to the third embodiment constructed as described above will be described using FIGS. 3 and 6.

The data transfer application 14 connects a logical connection and sets a data link using the same procedure as that in the first embodiment. The protocol processing portion 11 reports the value of NMR received at this time to the parameter calculating portion 51. When the reported NMR is eight, for example, the parameter calculating portion 51 outputs a value smaller than eight, for example, four (a value which is one-half of eight) as MaxPD to the parameter managing portion 12. Correspondingly, the parameter changing portion 121 in the parameter managing portion 12 changes the value of MaxPD in the parameter table 122 shown in FIG. 3 to four. Thereafter, data transfer is made using the same procedure as that in the first embodiment.

During data transfer processing, the protocol processing portion 11 reports to the parameter calculating portion 51 the NR and the NMR reported from a device on the receiving side at the time of receiving STAT. When the NR and the NMR reported at this time are respectively taken as 6 and 14, the parameter calculating portion 51 calculates eight which is the difference between them as a window size, and outputs a value which is smaller than eight, for example, four (a value which is one-half of eight) as MaxPD to the parameter managing portion 12. Correspondingly, the parameter managing portion 12 sets four in the MaxPD shown in FIG. 3. The protocol processing portion 11 hereinafter makes the data transfer while referring to the value of MaxPD.

Although in the above-mentioned third embodiment, the parameter calculating portion 51 takes a value which is one-half of the window size as MaxPD, other values can be used, provided that it is not more than the window size.

As described in the foregoing, according to the third embodiment, the window size is calculated on the basis of the NR and the NMR reported from the device on the receiving side, and a value smaller than the calculated window size is set as MaxPD. Even when the window size given from the device on the receiving side is small, the data transfer can be made without stopping the transmission of SDs due to the window size.

Fourth Embodiment

A fourth embodiment of the present invention will be described using FIGS. 1 and 7.

Figure 7A:
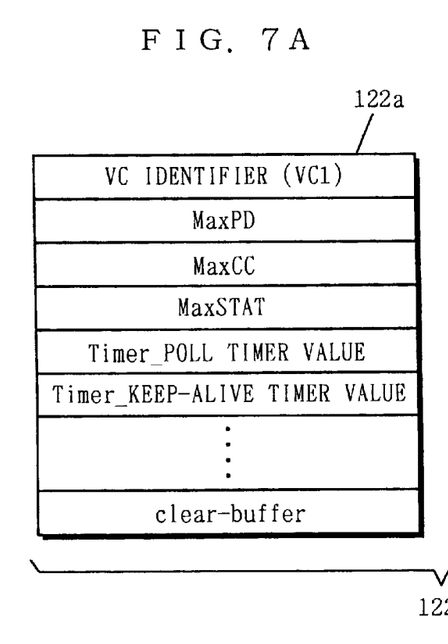
FIGS. 7A and 7B are diagrams showing the construction of a parameter table used in a fourth embodiment of the present invention.
Figure 7B:
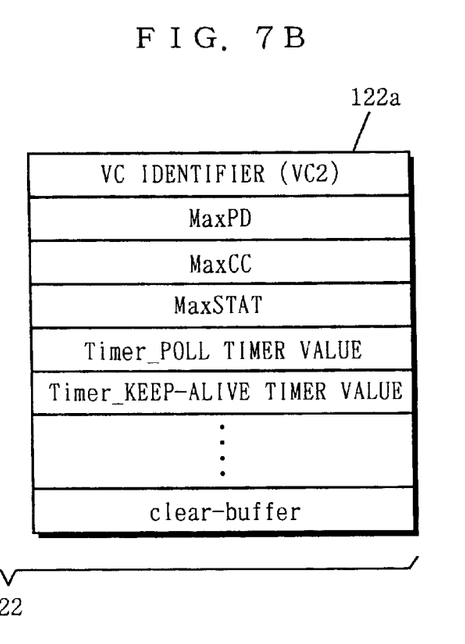

FIG. 7 illustrates a parameter table used in the fourth embodiment. Protocol parameters for a first logical connection VC1 and protocol parameters for a second logical connection VC2 are respectively stored in a first parameter table 122a shown in FIG. 7(a) and a second parameter table 122b shown in FIG. 7(b).

In the fourth embodiment, consider a case where a plurality of logical connections are set, and different data are transferred with the respective logical connections. The two logical connections are taken as first and second logical connections VC1 and VC2, and a destination of connection of the first logical connection VC1 and a destination of connection of the second logical connection VC2 are respectively taken as a first device and a second device.

A data transfer application 14 gives the number of data packets whose transfer is required at one time to a parameter managing portion 12 for each logical channel, as in the first embodiment. Correspondingly, a parameter changing portion 121 in the parameter managing portion 12 previously sets the number of data packets transferred at one time by the first logical connection VC1 in MaxPD in the first parameter table 122a, and previously sets the number of data packets transferred at one time by the second logical connection VC2 in MaxPD in the second parameter table 122b. Default values shall be set with respect to the other parameters shown in FIG. 7.

The data transfer application 14 then requires setting of connections in which addresses of destinations of connection of the two logical connections VC1 and VC2 are specified by a connection setting portion 13 in order to connect the logical connections.

When the setting of the logical connections by the connection setting portion 13 is completed, the data transfer application 14 sets on the first logical connection VC1 a data link between the data transfer device and the first device. Similarly, the data transfer application 14 sets on the second logical connection VC2 a data link between the data transfer device and the second device. When the setting of the respective data links is completed, the data transfer application 14 starts the data transfer.

In SSCOP processing, protocol processing is separately performed for each logical connection. Consequently, different sequence numbers are assigned to the data packets for each logical connection.

A protocol processing portion 11 produces SD to which a sequence number for the first device is added upon acceptance of a data transmission request addressed to the first device from the data transfer application 14, and transmits the SD to the first device. At this time, the protocol processing portion 11 increments a count value of a counter for counting the number of continuously transferred SDs in the first logical connection VC1 (provided inside the protocol processing portion 11) by one, compares the count value with the value of MaxPD set in the first parameter table 122a, and sends out POLL if the count value is not less than the value of MaxPD. The protocol processing portion 11 then produces SD to which a sequence number for the second device is added upon acceptance of a data request addressed to the second device from the data transfer application 14, and transmits the SD to the second device. At this time, the protocol processing portion 11 increments a count value of a counter for counting the number of continuously transferred SDs in the second logical connection VC2 (provided inside the protocol processing portion 11) by one, compares the count value with the value of MaxPD set in the second parameter table 122b, and sends out POLL if the count value is not less than the value of MaxPD.

Although in the fourth embodiment, the number of logical channels to be multiplexed is taken as 2, three or more logical channels can be multiplexed by managing protocol parameters corresponding to the number of logical channels to be multiplexed by the parameter managing portion 12.

Although in the fourth embodiment, the number of data packets transferred at one time is previously set as the value of MaxPD, a method of setting the value of MaxPD on the basis of a transmission interval of SDs (a second embodiment) and a method of setting the value of MaxPD on the basis of NMR designated from a device on the receiving side (a third embodiment) may be employed. In this case, it is necessary to perform for each logical channel both monitoring processing in the data transfer monitoring portion and calculating processing in the parameter calculating portion.

As described in the foregoing, according to the fourth embodiment, when the data transfer is made using the plurality of logical channels, the protocol parameters are separately managed for each of the logical channels, thereby the data transfer can be made for each logical channel in the most suitable state.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data transfer device for establishing data communication through an ATM network, comprising:

a connection setting portion operable to set a logical connection on the ATM network;

a protocol processing portion operable to perform protocol processing having a procedure for selective retransmission on said logical connection;

a parameter table operable to store a plurality of protocol parameters required for the protocol processing in said protocol processing portion and a parameter MaxPD for defining a transmission interval of delivery confirmation packets as one of said plurality of protocol parameters;

a parameter changing portion operable to chance the contents of settings of the protocol parameters stored in said parameter table depending on a communication state, and to change said parameter MaxPD;

wherein said parameter changing portion is operable to change said parameter MaxPD in accordance with the number of data packets transferred at one time on said logical connection and to change said parameter MaxPD in accordance with a number of data packets, into which data to be transferred is divided or which are designated to be transferred at one time, so as to deliver a confirmation packet immediately after the last data packet is transferred.

2. A data transfer device for establishing data communication through an ATM network, comprising:

a connection setting portion operable to set a logical connection on the ATM network;

a protocol processing portion operable to perform protocol processing having a procedure for selective retransmission on said logical connection;

a parameter table operable to store a plurality of protocol parameters required for the protocol processing in said protocol processing portion and a parameter MaxPD for defining a transmission interval of delivery confirmation packets as one of said plurality of protocol parameters;

a parameter changing portion operable to change the contents of settings of the protocol parameters stored in said parameter table depending on a communication state, and to change said parameter MaxPD;

a data transfer monitoring portion operable to monitor a transfer interval of the data packets transferred on said logical connection; and a parameter calculating portion operable to calculate an interval at which the delivery confirmation packets are to be transmitted based on the transfer interval of the data packets monitored by said data transfer monitoring portion;

wherein said parameter changing portion is operable to change said parameter MaxPD in accordance with results of the calculation by said parameter calculating portion.

3. The data transfer device according to claim 2, wherein said parameter table is operable to store a timer period Timer POLL for defining the maximum allowable transmission interval of the delivery confirmation packets as one of said plurality of protocol parameters, and said parameter calculating portion is operable to calculate the number of packets sent out in said timer period Timer POLL from the transfer interval of the data packets monitored by said data transfer monitoring portion, and to determine a value smaller than the calculated number of packets as an interval at which the delivery confirmation packets are to be transmitted.

4. A data transfer device for establishing data communication through an ATM network, comprising:

a connection setting portion operable to set a logical connection on the ATM network;

a protocol processing portion operable to perform protocol processing having a procedure for selective retransmission on said logical connection;

a parameter table operable to store a plurality of protocol parameters required for the protocol processing in said protocol processing portion and a parameter MaxPD for defining a transmission interval of delivery confirmation packets as one of said plurality of protocol parameters;

a parameter changing portion operable to change the contents of settings of the protocol parameters stored in said parameter table depending on a communication state, and to change said parameter MaxPD;

a parameter calculating portion operable to calculate the interval at which the delivery confirmation packets are to be transmitted based on a credit value NMR sent from the receiving side and a sequence number NR of a packet, whose delivery has been already confirmed, sent from the receiving side;

wherein said parameter changing portion is operable to change said parameter for defining the transmission interval in accordance with the results of the calculation by said parameter calculating portion.

5. The data transfer device according to claim 4, wherein said parameter calculating portion is operable to calculate the difference between said credit value NMR and said sequence number NR, and to set a value smaller than the calculated difference as an interval at which the delivery confirmation packets are to be transmitted.

* * * * *